United States Patent
Ganesan et al.

(10) Patent No.: US 9,602,240 B1
(45) Date of Patent: Mar. 21, 2017

(54) METHOD AND SYSTEM FOR SYMBOL LEVEL INTERFERENCE CANCELLATION AT A RECEIVER FOR MULTIUSER DETECTION

(71) Applicant: Signalchip Innovations Private Limited, Bengaluru (IN)

(72) Inventors: Aravind Ganesan, Bengaluru (IN); Deepak Karkala, Bengaluru (IN); Rajesh Mundhada, Bengaluru (IN)

(*) Notice: Subject to any disclaimer, the term of this patent is extended or adjusted under 35 U.S.C. 154(b) by 0 days.

(21) Appl. No.: 15/043,803

(22) Filed: Feb. 15, 2016

(30) Foreign Application Priority Data

Sep. 11, 2015 (IN) .......................... 4846/CHE/2015

(51) Int. Cl.
*H04L 1/00* (2006.01)
*H04J 11/00* (2006.01)

(52) U.S. Cl.
CPC ........ *H04L 1/0048* (2013.01); *H04J 11/0063* (2013.01)

(58) Field of Classification Search
CPC .............. H04B 1/71075; H04B 7/0413; H04B 1/71072; H04B 1/7103; H04B 1/7107; H04B 1/7105; H04B 2001/71077; H04L 25/03305; H04L 25/03891; H04L 25/03286; H04L 1/0048
USPC ................. 375/144, 148, 267, 299, 347–350
See application file for complete search history.

(56) References Cited

U.S. PATENT DOCUMENTS

| | | | | |
|---|---|---|---|---|
| 7,212,579 B2* | 5/2007 | Claussen | ................. | H04L 1/005 375/267 |
| 7,248,647 B2* | 7/2007 | Claussen | ............... | H03M 13/25 332/103 |
| 7,302,233 B2* | 11/2007 | Onggosanusi | ...... | H04L 25/0204 370/342 |
| 8,111,669 B2* | 2/2012 | Liberti, Jr. | ......... | H04B 1/71055 370/335 |
| 8,660,217 B2* | 2/2014 | Choi | ..................... | H04L 1/0048 375/316 |
| 8,781,043 B2* | 7/2014 | Shim | .................. | H04B 1/71072 370/335 |
| 8,949,683 B1* | 2/2015 | Sun | ....................... | H03M 13/09 714/758 |

(Continued)

*Primary Examiner* — Emmanuel Bayard
(74) *Attorney, Agent, or Firm* — The Law Office of Austin Bonderer, PC; Austin Bonderer

(57) ABSTRACT

Methods and systems of symbol level interference cancellation at a receiver for multiuser detection is provided. In an embodiment, the method includes performing an interference cancellation based decoding for a plurality of users through a plurality of iterations for generating a plurality of soft bit estimates for each of the users during each of the iterations. Each of the iterations involves sequential cancellation of each of the user signals for performing interference cancellation based decoding for each subsequent user other than a first user. The method also includes re-using the generated plurality of soft bit estimates for performing each subsequent iteration of the interference cancellation based decoding of the plurality of users. A plurality of soft bit estimates associated with each user generated during an $(N-1)^{th}$ iteration is re-used during an $N^{th}$ iteration for the user, N being a whole number with a minimum value of 2.

22 Claims, 9 Drawing Sheets

(56) References Cited

U.S. PATENT DOCUMENTS

| | | | |
|---|---|---|---|
| 9,166,669 B1* | 10/2015 | Annavjjala | H04B 7/0857 |
| 9,294,223 B2* | 3/2016 | Webster | H04L 1/0048 |
| 2005/0157811 A1* | 7/2005 | Bjerke | H04L 1/0003 |
| | | | 375/267 |
| 2007/0110135 A1* | 5/2007 | Guess | H04L 1/0048 |
| | | | 375/148 |
| 2011/0013684 A1* | 1/2011 | Semenov | H04L 25/03006 |
| | | | 375/232 |

* cited by examiner

METHOD AND SYSTEM FOR SYMBOL LEVEL INTERFERENCE CANCELLATION AT A RECEIVER FOR MULTIUSER DETECTION

CROSS-REFERENCE TO RELATED APPLICATIONS

This application claims priority to Indian patent application no. 4846/CHE/2014 filed on Sep. 11, 2015, the complete disclosure of which, in its entirely, is herein incorporated by reference.

BACKGROUND

Technical Field

The embodiments herein generally relate to a multiuser communication channel, and, more particularly, to a system and method of detecting multiuser based on symbol level interference cancellation at the soft demapper input in a receiver.

Description of the Related Art

In a wireless communication system, a central base station communicates with a plurality of remote terminals, such as cellular mobile phones. Frequency-Division Multiple Access (FDMA) and Time-Division Multiple Access (TDMA) are the traditional multiple access schemes to provide simultaneous services to a number of terminals. The basic idea behind FDMA and TDMA techniques is to slice the available resource into multiple frequency or time slots, respectively, so that multiple terminals can be accommodated without causing interference.

Contrasting these schemes with separate signals in frequency or time domains, Code-Division Multiple Access (CDMA) allows multiple users to share a common frequency and time channel by using code-division multiplexing.

Wideband Code Division Multiple Access (WCDMA) is an air interface standard found in 3G mobile telecommunications networks. WCDMA supports conventional cellular voice, text and MMS services, but can also carry data at high speeds, allowing mobile operators to deliver higher bandwidth applications including streaming and broadband Internet access. WCDMA has been developed into a complete set of specifications, a detailed protocol that defines how a mobile phone communicates with the tower, how signals are modulated, how datagrams are structured, and system interfaces are specified allowing free competition on technology elements.

In WCDMA uplink receiver, each user is assigned a scrambling code which is a random sequence of length 38400. Although, these codes possess good autocorrelation and cross correlation properties, they are not perfectly orthogonal. This combined with multipath propagation makes WCDMA uplink receiver an interference limited system.

Due to the presence of interference, each user has to transmit at a higher power in order to meet the quality of service. This limits the coverage and capacity of the WCDMA uplink receiver. As a result, there is need for a technique for multiuser detection in the WCDMA uplink receiver. The typical multiuser detection involves jointly decoding all the user signals using the Maximum Likelihood (ML) criteria. But, the complexity of the typical multiuser detection increases exponentially with the number of users. A lot of emphasis has been on developing suboptimal methods for multiuser detection. In an existing interference cancellation method, each user's received signal is reconstructed and cancelled from the composite received signal. The interference cancelled signal is then processed to make the bit decisions better with iterations.

However, the major drawback of the conventional multiuser detection methods is due to high computational complexity involved. The extra complexity is not desirable at the low-cost base station, which possess limited memory and processing capacity.

Accordingly, there remains a need for a system and method that reduces storage requirement and processing capability during symbol level interference cancellation at a receiver, without compromising the receiver performance.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

Several methods and systems for symbol level interference cancellation at a receiver for multiuser detection are disclosed. In one aspect, the method includes performing an interference cancellation based decoding for a plurality of users through a plurality of iterations for generating a plurality of soft bit estimates for each of a plurality of users during each of the plurality of iterations, wherein each of the plurality of iterations involves sequential cancellation of each of the user signals for performing interference cancellation based decoding for each subsequent user other than a first user. The method further includes re-using the generated plurality of soft bit estimates for performing each subsequent iteration of the interference cancellation based decoding of the plurality of users. The plurality of soft bit estimates associated with each user generated during an $(i-1)^{th}$ iteration for the user is re-used for during an $i^{th}$ iteration for the user, wherein i is a whole number with a minimum value of 2. The interference cancellation based decoding as disclosed herein may be performed through a serial interference cancellation process or through a parallel interference cancellation process.

In an embodiment, during the serial interference cancellation process, a first iteration from among the plurality of iterations for a first user from among the plurality of users includes receiving a composite signal at the receiver and performing the interference cancellation based decoding using the received composite signal for the first user, for generating a first user first iteration soft bit estimates and generating an first interference cancelled signal by eliminating a first user signal from the composite signal. The decoding includes performing a soft demapping of the received composite signal at a soft demapper of a decoder block of the receiver to generate the first user first iteration soft bit estimates corresponding to a first soft cancelled signal associated with the first user. The generated first user first iteration soft bit estimates is stored in a memory unit associated with the receiver. Further the first soft cancelled signal is reconstructed at a reconstruction block of the receiver, to generate a first user first iteration reconstructed signal for the first user, during the first iteration and the first user first iteration reconstructed signal is cancelled from the composite signal to generate a first interference cancelled signal.

In an embodiment, during the parallel interference cancellation process, the first iteration for a first user and a second user from among the plurality of users includes receiving a composite signal at a decoder block of the receiver and decoding the received composite signal at the decoder block to generate at least one of: a first soft cancelled signal comprising a first user first iteration soft bit estimates for a first user and a second soft cancelled signal comprising a second user first iteration soft bit estimates for a second user, during the first iteration, the first user first iteration soft bit estimates and the second user first iteration soft bit estimates are stored in a memory unit. Further, the first soft cancelled signal is reconstructed, at a reconstruction block to generate a first user first iteration reconstructed signal corresponding to the first user and the second soft cancelled signal is also reconstructed parallely to generate a second user first iteration reconstructed signal corresponding to the second user, during the first iteration. The first user first iteration reconstructed signal and the second user second iteration reconstructed signal is added to generate a first combined reconstructed signal. The first combined reconstructed signal is cancelled from the received composite signal to generate a first interference cancelled signal.

In an embodiment, the decoding includes performing a soft demapping of the received composite signal at a soft demapper of the decoder block to generate the first user first iteration soft bit estimates and the second user first iteration soft bit estimates and storing the generated first user first iteration soft bit estimates and the second user first iteration soft bit estimates in the memory unit associated with the receiver.

In another aspect, a receiver circuit for multiuser detection based on symbol level interference cancellation is disclosed. The receiver is configured to perform an interference cancellation based decoding for a plurality of users through a plurality of iterations for generating a plurality of soft bit estimates for each of the plurality of users during each of the plurality of iterations. Each of the plurality of iterations involves sequential cancellation of each of the user signals for performing interference cancellation based decoding for each subsequent user other than a first user. The receiver is also configured to re-use the generated plurality of soft bit estimates for performing each subsequent iteration of the interference cancellation based decoding of the plurality of users. A plurality of soft bit estimates associated with each user generated during an $(N-1)^{th}$ iteration for the user is re-used for during an $i^{th}$ iteration for the user, wherein i is a whole number with a minimum value of 2.

In an embodiment, the receiver includes a decoder block including a RAKE receiver circuit and a soft demapper. The RAKE receiver circuit is configured to receive a composite signal at the receiver. The RAKE receiver circuit demodulates the received signal through a combination of steps including RAKE combining, descrambling, dispreading for multiplicity of users and channels associated with users. The soft demapper is communicatively associated with the RAKE receiver and is configured perform decoding using the received composite signal for the first user, for generating a first user first iteration soft bit estimates and generating an first interference cancelled signal by eliminating a first user signal from the composite signal, during a first iteration from among the plurality of iterations for a first user from among the plurality of users. The soft demapper is configured to perform a soft demapping of the received composite signal to generate the first user first iteration soft bit estimates corresponding to a first soft cancelled signal associated with the first user and storing the generated first user first iteration soft bit estimates of the first soft cancelled signal in a memory unit associated with the receiver. The receiver also includes a reconstruction block communicatively associated with the decoder block and configured to reconstruct the first soft cancelled signal to generate a first user first iteration reconstructed signal for the first user, during the first iteration for a first user. The receiver further includes a cancellation unit coupled to the reconstruction block configured to cancel the first user first iteration reconstructed signal from the composite signal to generate a first interference cancelled signal.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1A:
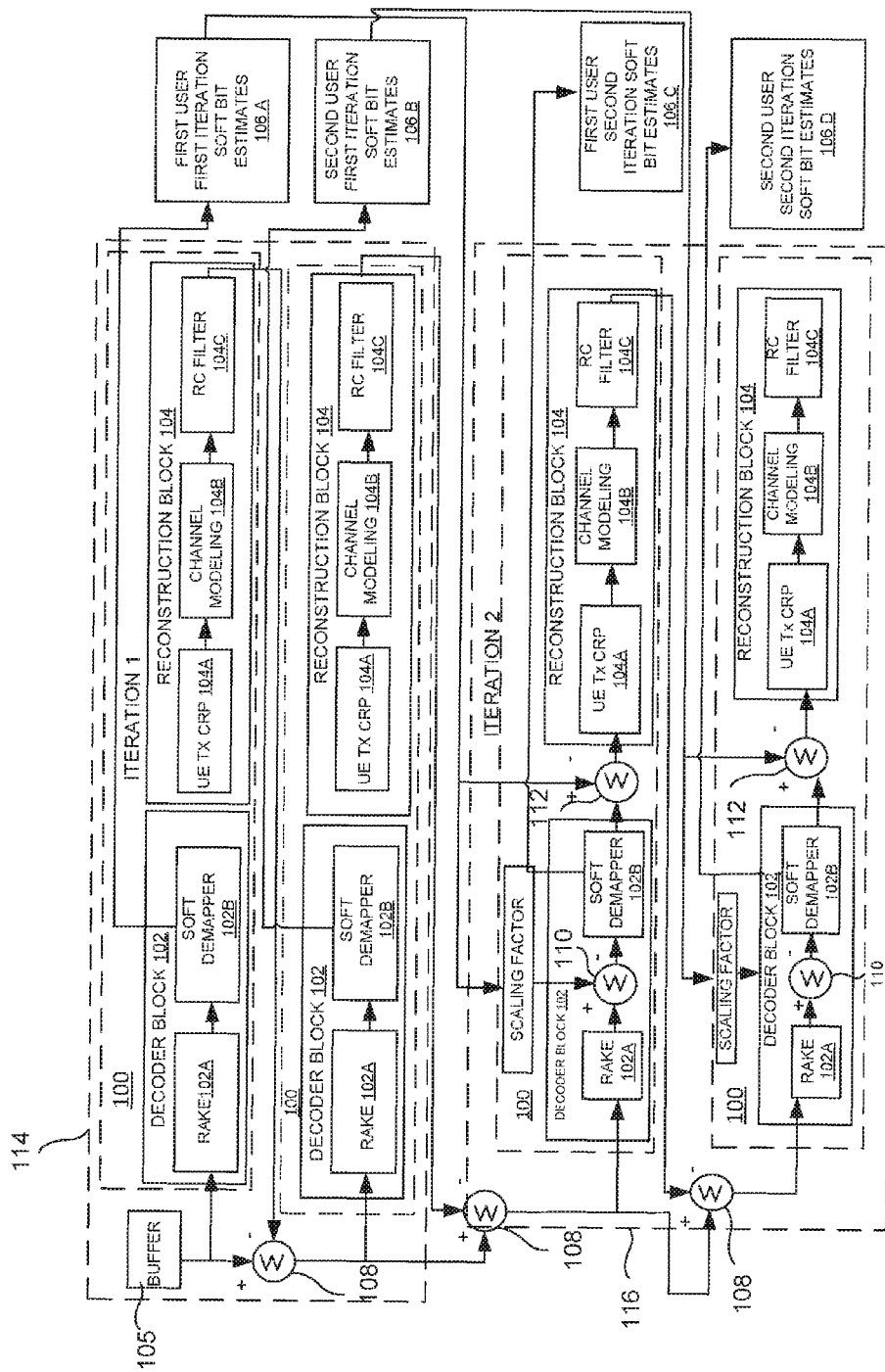
FIG. 1A depicts a systematic process flow for multiuser detection process based on serial interference cancellation at a receiver, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the present technology provide a method and a system to reduce storage requirement and processing capability during symbol level interference cancellation at a receiver, without compromising on the receiver performance. Referring now to the drawings, and more particularly to FIGS. 1A through 3, where similar reference characters denote corresponding features consistently throughout the figures, there are shown preferred embodiments.

FIG. 1A depicts a systematic process flow for multiuser detection process based on serial interference cancellation at a receiver 100, according to an embodiment herein. In an embodiment, the receiver 100 is a WDCMA uplink receiver. In other embodiments, the receiver 100 may include, for example, worldwide interoperability for microwave access (WiMAX) uplink receiver, global system for mobile communication uplink receiver, tamed frequency modulation (TFM) uplink receiver and the like. In an embodiment, the receiver 100 includes a decoder block 102, and a reconstruction block 104. In an embodiment, the decoder block 102 includes a rake receiver circuit (RAKE) 102A and a soft demapper 102B. In an embodiment, the reconstruction block 104 includes a user equipment (UE) transmit chip rate processor (UE TX CRP) 104A, a channel modeling 104B, and a raised cosine RC filter 104C. The receiver 100 is configured to perform an interference cancellation based decoding for a plurality of users through a plurality of iterations for generating a plurality of soft bit estimates for each of the plurality of users during each of the plurality of iterations. Each of the plurality of iterations involves sequential cancellation of each of the user signals for performing interference cancellation based decoding for each subsequent user other than a first user. The receiver 100 is also configured to re-use the generated plurality of soft bit estimates for performing each subsequent iteration of the interference cancellation based decoding of the plurality of users, such that a plurality of soft bit estimates associated with each user generated during an $(i-1)^{th}$ iteration for the user is re-used for during an $i^{th}$ iteration for the user, wherein i is a whole number with a minimum value of 2.

In an embodiment, during a first iteration 114 for a first user, the RAKE 102A receives a composite signal from for example, a buffer 105 (such as an original buffer). The RAKE 102A demodulates the received composite signal through a combination of steps including RAKE combining, descrambling, dispreading for multiplicity of users and channels associated with users and the like. The decoder block 102 performs decoding using the demodulated composite signal for the first user, for generating a first user first iteration soft bit estimates 106A and generating a first interference cancelled signal by eliminating a first user signal from the composite signal. During decoding, the soft demapper 102B of the receiver performs a soft demapping of the demodulated composite signal received from RAKE to generate the first user first iteration soft bit estimates 106A corresponding to a first soft cancelled signal associated with the first user. The soft demapper 102B stores the generated first user first iteration soft bit estimates of first soft cancelled signal in a memory unit associated with the receiver 100. The reconstruction block 104 of the receiver 100 reconstructs the first soft cancelled signal to generate a first user first iteration reconstructed signal for the first user, during the first iteration 114. The first user first iteration reconstructed signal is cancelled from the composite signal to generate a first interference cancelled signal at a cancellation unit 108.

During the first iteration 114 for a second user, the decoder block 102 performs demodulation using the first interference cancelled signal, for generating a second user first iteration soft bit estimates 106B and generates a second interference cancelled signal by eliminating a second user signal from the first interference cancelled signal. The soft demapper 102B performs a soft demapping of the generated first interference cancelled signal to generate the second user first iteration soft bit estimates 106B associated with the second soft cancelled signal, during the first iteration 114 for the second user. The memory unit 106 stores the generated second user first iteration soft bit estimates 106B in a memory unit associated with the receiver 100. The reconstruction block 104 reconstructs generated second soft cancelled signal, to generate the second user first iteration reconstructed signal for the second user, during the first iteration 114. The reconstructed signal for the second user is cancelled from the first interference cancelled signal to generate a second interference cancelled signal. The cancellation is performed at the cancellation unit 108. In an embodiment, a first iteration for an $N^{th}$ user includes performing an interference cancellation based decoding using an $(N-1)^{th}$ interference cancelled signal generated for generating an $N^{th}$ user $1^{st}$ iteration soft bit estimates and an $N^{th}$ interference cancelled signal by eliminating an $N^{th}$ user signal from the $(N-1)^{th}$ interference cancelled signal. The interference cancellation based decoding includes decoding the $(N-1)^{th}$ interference cancelled signal by performing soft demapping of said $(N-1)^{th}$ interference cancelled signal at the soft demapper 102B of a decoder block to generate the $N^{th}$ user $1^{st}$ iteration soft bit estimates associated with an $N^{th}$ soft cancelled signal. The generated $N^{th}$ user $1^{st}$ iteration soft bit estimates is stored in a memory unit. The reconstruction block 104 reconstructs the generated $N^{th}$ soft cancelled signal, to generate the $N^{th}$ reconstructed signal for the $N^{th}$ user, during the first iteration 114, and the cancellation unit 108 cancels the $N^{th}$ reconstructed signal for the second user from the $(N-1)^{th}$ interference cancelled signal to generate an $N^{th}$ interference cancelled signal.

During a second iteration 116 for the first user, the decoder block 102 decodes the $N^{th}$ interference cancelled signal corresponding to an $N^{th}$ user. A multiplier unit 110 of the receiver 100 multiplies the $N^{th}$ user first iteration soft bit estimates 106A with a scaling factor and adds the multiplied $N^{th}$ user first iteration soft bit estimates to a demodulated signal obtained from the second interference cancelled signal to obtain a first intermediate signal. In an embodiment, the scaling factor includes a spreading factor and a channel gain, which is a square value of the channel estimates (SCALE=SF·|H|$^2$). The soft demapper 102B performs soft demapping of first intermediate signal for generating a first user second iteration soft bit estimates 106C for the first user. The memory unit stores the generated first user second iteration soft bit estimates 106C. In an embodiment, a cancellation unit 112 cancels the first user first iteration soft bit estimates 106A from the first user second iteration soft bit estimates 106C to generate a third decoded signal. The reconstruction block 104 reconstructs the third soft cancelled signal for generating the first user second iteration reconstructed signal for the first user during the second iteration 116. The first user second iteration reconstructed signal is cancelled from the second interference cancelled signal to generate a third interference cancelled signal.

During the second iteration 116 for the second user, the decoder block 102 decodes the third interference cancelled signal. During decoding, the multiplier unit 110 multiplies the second user first iteration soft bit estimates 106B with a scaling factor and adds the multiplied second user first iteration soft bit estimates 106B to a demodulated signal obtained from the third interference cancelled signal to obtain a second intermediate signal. The soft demapper 102B performs second intermediate signal at the soft demapper for generating second user second iteration soft bit estimates 106D for the second user. The memory unit stores the generated second user second iteration soft bit estimates 106D. The cancellation unit 112 cancels the second user first iteration soft bit estimates 106B from the first iteration from the second user second iteration soft bit estimates 106D for generating a fourth soft cancelled signal. The reconstruction block 104 reconstructs the fourth soft cancelled signal for generating the fourth reconstructed signal for the second user during said second iteration 116.

As illustrated in FIG. 1A, instead of re-using the reconstructed signal from a previous iteration as in the conventional process, in the systematic process flow as illustrated in FIG. 1A, the soft bit estimates alone generated during a previous iteration is re-used during a current iteration by multiplying the soft bit estimates with a scaling factor and adding along with input of soft demapper during a current iteration for a given user. Also, a difference in the soft bit estimates of the current iteration and the previous iteration forms the input to reconstruction block 104 during current iteration. Also the reconstructed signal of all users are removed from the buffer and the difference signal is passed through the decoder block 102. Accordingly, the process as described in FIG. 1A requires storing only the soft bit estimates (such as 106A-D) to be re-used during subsequent iterations, and does not require storing of the reconstructed signal for all users. Instead only the soft bits for each user is stored and the reconstructed signal is cancelled from the buffer 105 and subsequent interference cancelled signals. The process disclosed herein thereby would require considerably less storage than storing complex reconstructed signals of all the users as in a conventional approach, thereby reducing storage requirement significantly without compromising on performance of the receiver 100. Although FIG. 1A illustrates the process of multiuser detection involving only two users and two iterations, the process as illustrated in FIG. 1A is repeated for multiple users during multiple iterations.

Figure 1B:
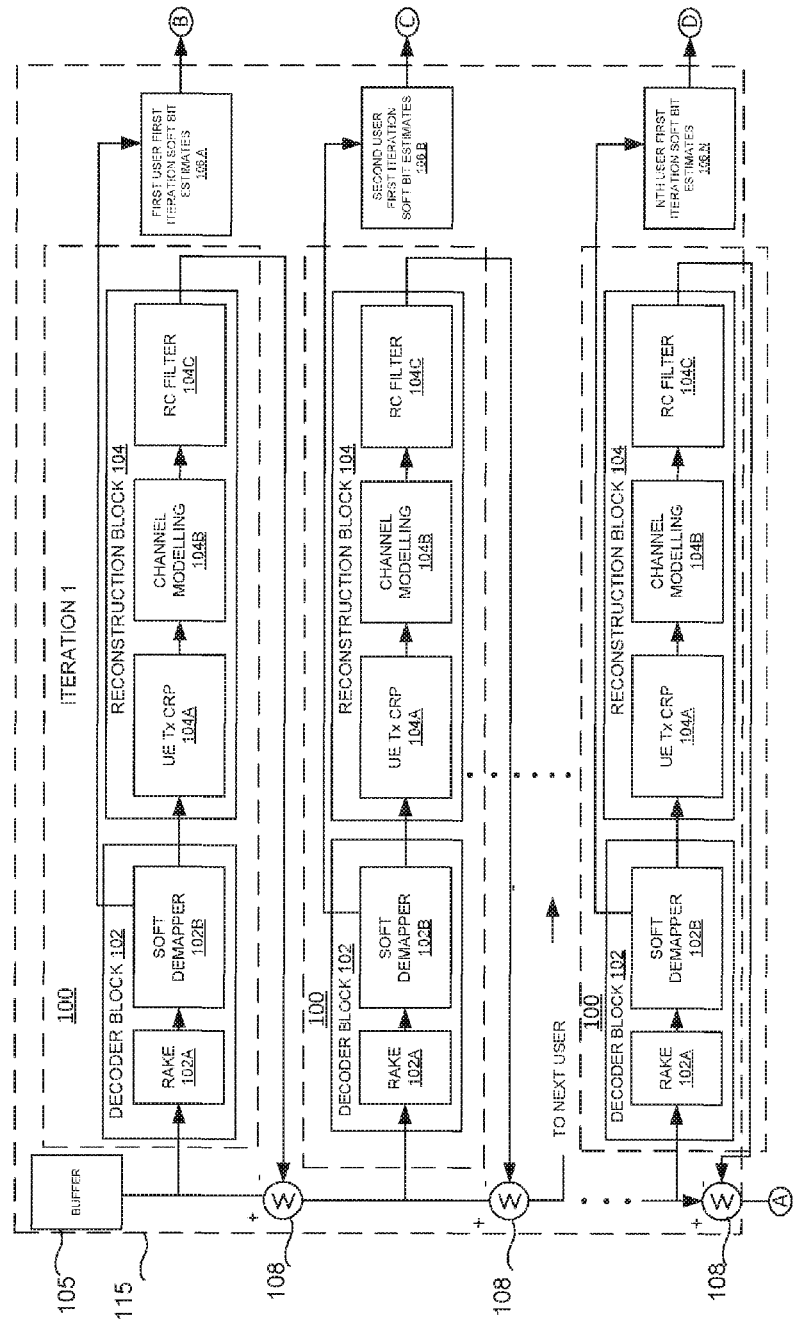
FIGS. 1B-1D depicts a systematic process flow of a process of multiuser detection process based on serial interference cancellation involving multiple users and multiple iterations at a receiver, according to an embodiment herein.
Figure 1C:
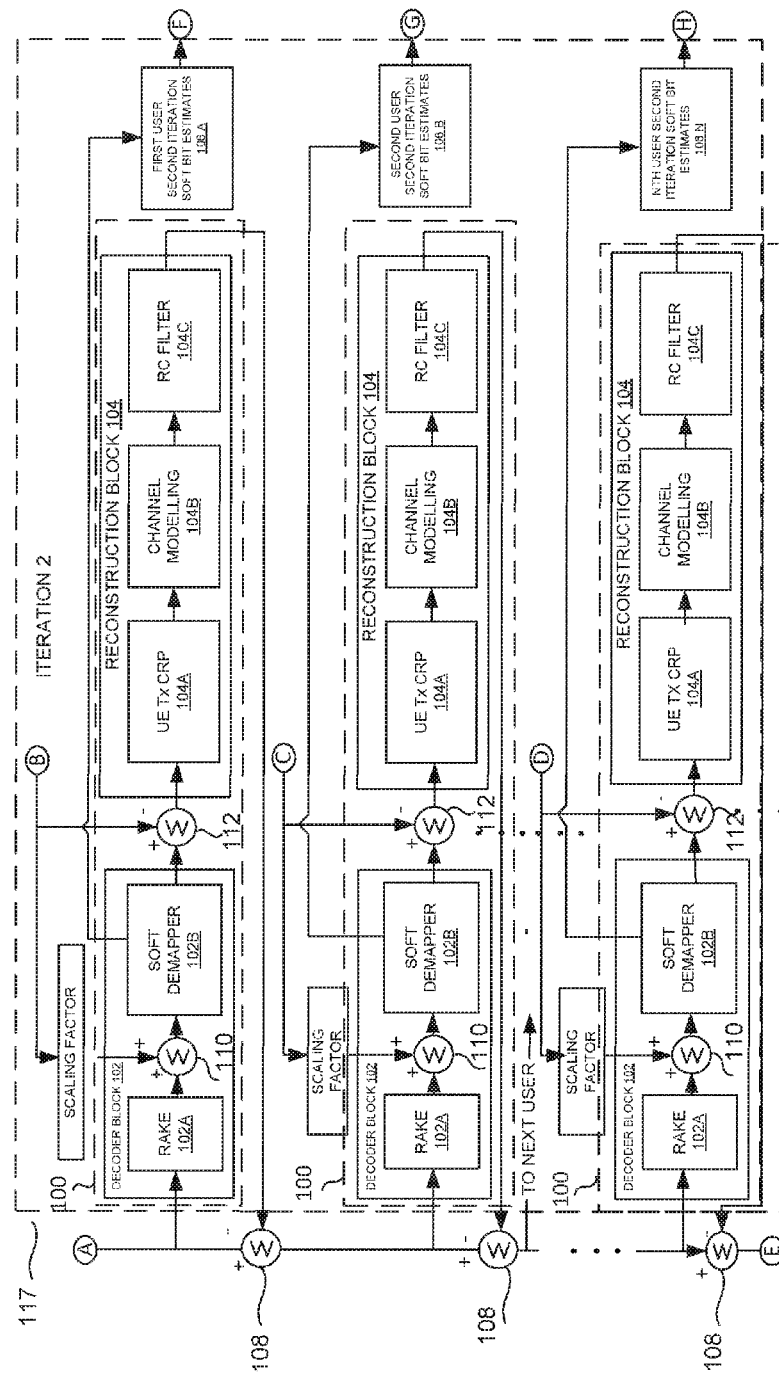
Figure 1D:
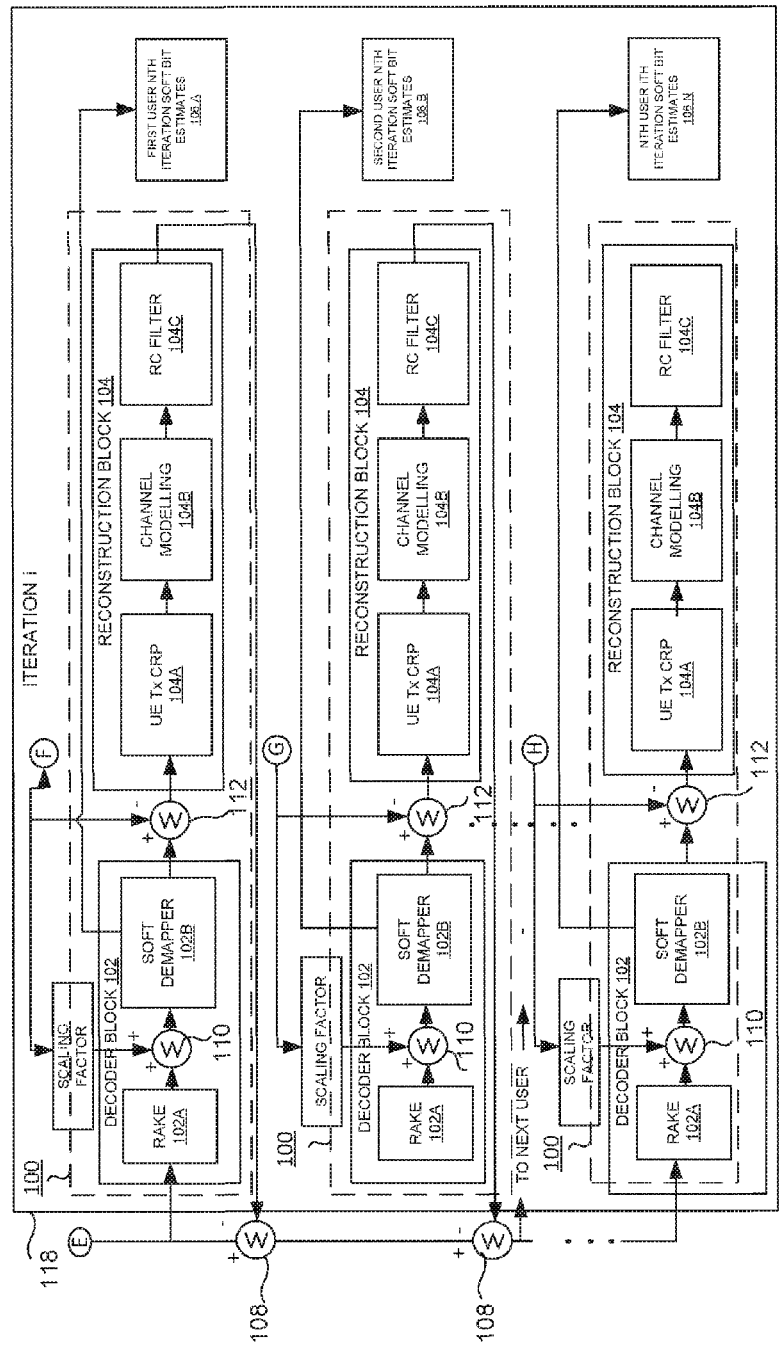

FIGS. 1B-1D illustrates a systematic process flow of a process of multiuser detection at the receiver 100 based on serial interference cancellation involving multiple users and multiple iterations, according to an embodiment herein. FIG. 1B depicts a first iteration 115 for N users, where N is a whole number greater than 1. The first iteration 115 of FIG. 1B for the first user is substantially similar to the first iteration 114 for the first user as described along with FIG. 1A and the first iteration 115 of FIG. 1B for every subsequent user is substantially similar to the first iteration 114 for the second user as described along with FIG. 1A. During the first iteration the soft bit estimates (such as 106A-106N) generated for N users is stored in the memory. FIG. 1C depicts a second iteration 117 for N users. The second iteration 117 of FIG. 1C for the first user is substantially similar to the second iteration 116 for the first user as described along with FIG. 1A and the second iteration 117 of FIG. 1C for every subsequent user is substantially similar to the second iteration 116 for the second user as described along with FIG. 1A.

The soft bit estimates (such as 106A-106N) generated for N users during the second iteration 115 is also stored in the memory for subsequent use. FIG. 1D depicts an $i^{th}$ iteration 118 for N users. The $i^{th}$ iteration 118 of FIG. 1D for the first user is substantially similar to the second iteration 116 for the first user as described along with FIG. 1A and the $i^{th}$ iteration 118 of FIG. 1D for every subsequent user is substantially similar to the second iteration 116 for the second user as described along with FIG. 1A. The soft bit estimates (such as 106A-106N) generated for N users during the i iterations is also stored in the memory for subsequent use. In an embodiment, during an $i^{th}$ iteration from among the plurality of iterations for the $N^{th}$ user from among the plurality of users, i being a positive integer greater than 1, the decoder block 102 multiplies the $N^{th}$ user $(i-1)^{th}$ iteration soft bit estimates with a scaling factor and adds the multiplied $N^{th}$ user $(i-1)^{th}$ iteration soft bit estimates to a demodulated signal obtained from an interference cancelled signal generated from one of $i^{th}$ iteration for $(N-1)^{th}$ user or generated from $(i-1)^{th}$ iteration for $N_{total}$ user to obtain an intermediate signal, wherein $N_{total}$ is a total number of users.

The soft demapper 102B performs a soft demapping of the intermediate signal for generating $N^{th}$ user $i^{th}$ iteration soft bit estimates for the $N^{th}$ user and stores the generated $N^{th}$ user $i^{th}$ iteration soft bit estimates in a memory unit associated with the receiver. The cancellation unit 112 cancels the $N^{th}$ user first iteration soft bit estimates from the $N^{th}$ user $(i-1)^{th}$ iteration soft bit estimates for generating $N^{th}$ soft cancelled signal. The reconstruction block 104 reconstructs the $N^{th}$ soft cancelled signal for generating the $N^{th}$ user $i^{th}$ iteration reconstructed signal. The cancellation unit 108, cancels the $i^{th}$ iteration reconstructed signal from the $(i-1)^{th}$ iteration interference cancelled signal to generate the $k^{th}$ interference cancelled signal, where k is (iteration−1) *$N_{total}$+N, $N_{total}$ being a total number of users, iteration being a current iteration.

Figure 2A:
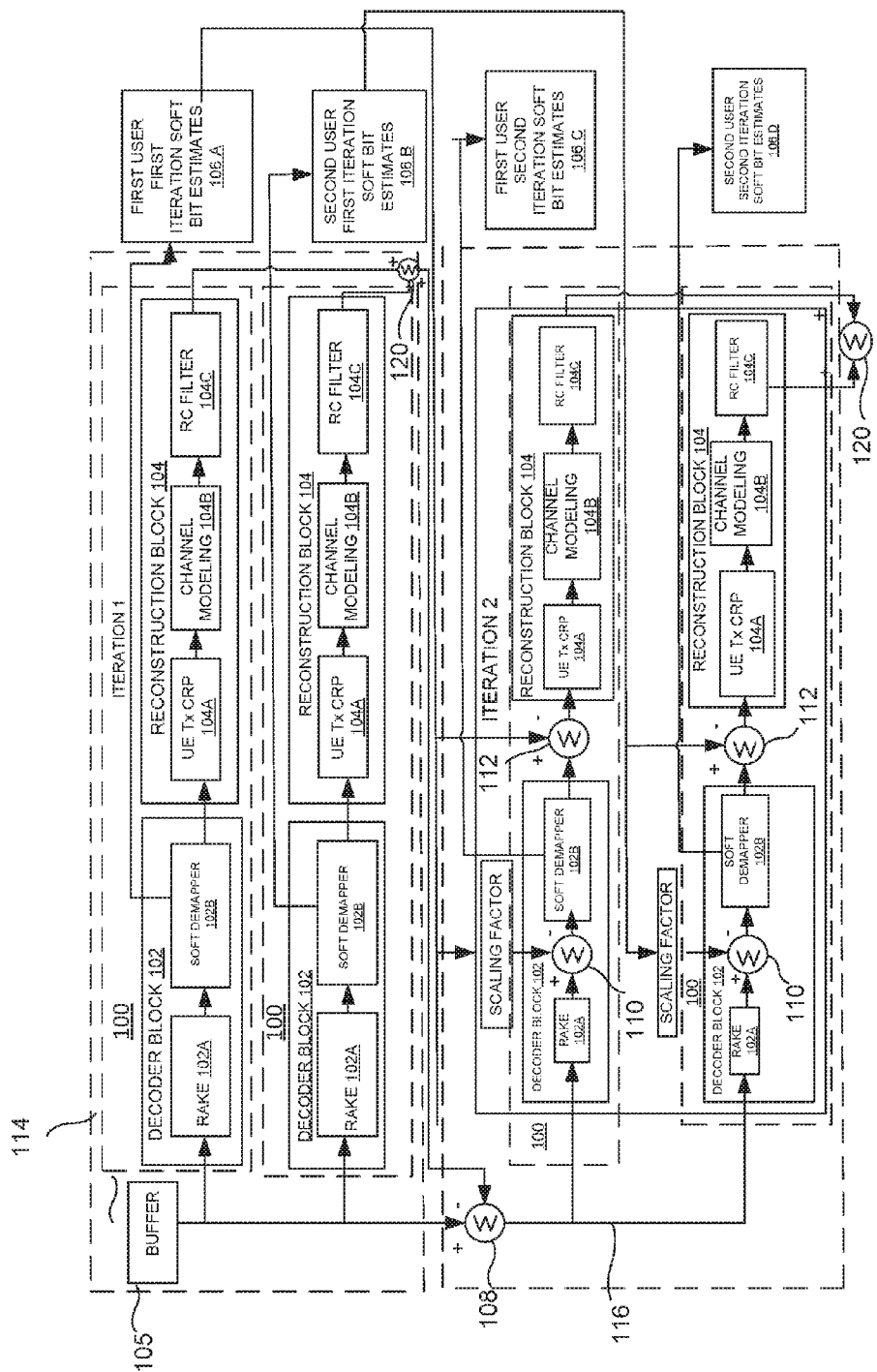
FIG. 2A depicts a systematic process flow for multiuser detection process based on parallel interference cancellation at a receiver, according to an embodiment herein.

FIG. 2A depicts a systematic process flow for multiuser detection process based on parallel interference cancellation at the receiver 100, according to an embodiment herein. In an embodiment, the decoder block 102 of the receiver 100 receives a composite signal to from a buffer 105 for decoding the received composite signal to generate at least one of: a first user first iteration soft bit estimates 106A for a first user and a second user first iteration soft bit estimates 106B for a second user, during the first iteration 114. The first user first iteration soft bit estimates 106A and the second user first iteration soft bit estimates 106B are stored in a memory unit. In an embodiment, the RAKE 102A demodulates the received composite signal through a combination of steps including RAKE combining, descrambling, dispreading for multiplicity of users and channels associated with users and the like. The reconstruction block 104 reconstructs the a first user first iteration soft bit estimates 106A to generate a first user first iteration reconstructed signal corresponding to the first user and reconstructs the second user first iteration soft bit estimates 106B to generate a second user first iteration reconstructed signal corresponding to the second user, during the first iteration 114. The adder unit 120 adds the generated first user first iteration reconstructed signal and the generated second user second iteration reconstructed signal to generate a first combined reconstructed signal.

The cancellation unit 108 cancels the first combined reconstructed signal from the received composite signal to generate a first interference cancelled signal. During the decoding, the soft demapper 102B performs soft demapping of the received composite signal to generate the first user first iteration soft bit estimates 106A and the second user first iteration soft bit estimates 106B. A memory unit of the receiver 100 stores the generated first user first iteration soft bit estimates 106A and the second user first iteration soft bit estimates 106B in the memory unit associated with the receiver.

The first combined reconstructed signal is cancelled from the received composite signal through the adder/subtractor unit 108 to generate a first interference cancelled signal. During the second iteration 116 for the first user and the second user, the decoder block 102 decodes the first interference cancelled signal. During decoding, the multiplier unit 110 of the receiver multiplies the stored first user first iteration soft bit estimates with a scaling factor and multiplied first user first iteration soft bit estimates 106A is added to the said first user demodulated signal obtained from the first interference cancelled signal for the first user to obtain a first intermediate signal and multiplying the stored second user first iteration soft bit estimates 106B with the scaling factor and adding the multiplied second user first iteration soft bit estimates 106B to the second user demodulated signal obtained from the first interference cancelled signal to obtain a second intermediate signal. The multiplier unit 110 multiplies the stored second user first iteration soft bit estimates 106B with the scaling factor and adds the multiplied second user first iteration soft bit estimates to the second user demodulated signal obtained from the first interference cancelled signal to obtain a second intermediate signal. The soft demapper 102B performs a soft demapping of the first intermediate signal generate a first user second iteration soft bit estimates, during the second iteration and soft demapping of the second intermediate signal to generate a second user second iteration soft bit estimates, during the second iteration. The memory unit stores the generated first user second iteration soft bit estimates 106C and the generated second user second iteration soft bit estimates 106D in the memory unit associated with the receiver.

In an embodiment, the cancellation unit 112 cancels the first user first iteration soft bit estimates 106A of the first iteration from the first user second iteration soft bit estimates 106C for generating a third soft cancelled signal and also cancels the second user first iteration soft bit estimates 106B of the first iteration from the second user second iteration soft bit estimates 106D for generating a fourth soft cancelled signal. Subsequently, the reconstruction block 104 reconstructs the generated third soft cancelled signal, (b) generated fourth soft cancelled signal to generate (i) the first user second iteration reconstructed signal for the first user and (ii) the second user second iteration reconstructed signal for the second user respectively. In an embodiment, the first set of soft bit estimates 106a generated during the first iteration 114 is used for decoding the first interference cancelled signal corresponding to the first user during the second iteration 116. In an embodiment, the second set of soft bit estimates 106B generated during the first iteration 114 is used for decoding the first interference cancelled signal corresponding to the second user during the second iteration 116. The addition unit 120 adds the generated third reconstructed signal and the generated fourth reconstructed signal to generate a second combined reconstructed signal.

The second combined reconstructed signal is cancelled from the received composite signal to generate a second interference cancelled signal. As illustrated in FIG. 2A, in the systematic process flow as illustrated in FIG. 2A, the soft bit estimates alone generated during a previous iteration is re-used during a current iteration by multiplying the soft bit estimates with a scaling factor and adding along with input of soft demapper during a current iteration for a given user. Also, a difference in the soft bit estimates of the current iteration and the previous iteration forms the input to reconstruction block 104 during current iteration. Also the reconstructed signal of all users are removed from the buffer and the difference signal is passed through the decoder block 102. Accordingly, the process as described in FIG. 2A requires storing only the soft bit estimates (such as 106A-D) to be re-used during subsequent iterations, and does not require storing of the reconstructed signal for all users. Instead only the soft bits for each user is stored and the reconstructed signal is cancelled from the buffer 105 and subsequent interference cancelled signals. The process disclosed herein thereby would require considerably less storage than storing complex reconstructed signals of all the users as in a conventional approach, thereby reducing storage requirement significantly without compromising on performance of the receiver 100. The process thereby reduces storage requirement significantly without compromising on performance of the receiver. Although FIG. 2A illustrates the process of multiuser detection involving only two users and two iterations, the process as illustrated in FIG. 2A is repeated for multiple users during multiple iterations.

Figure 2B:
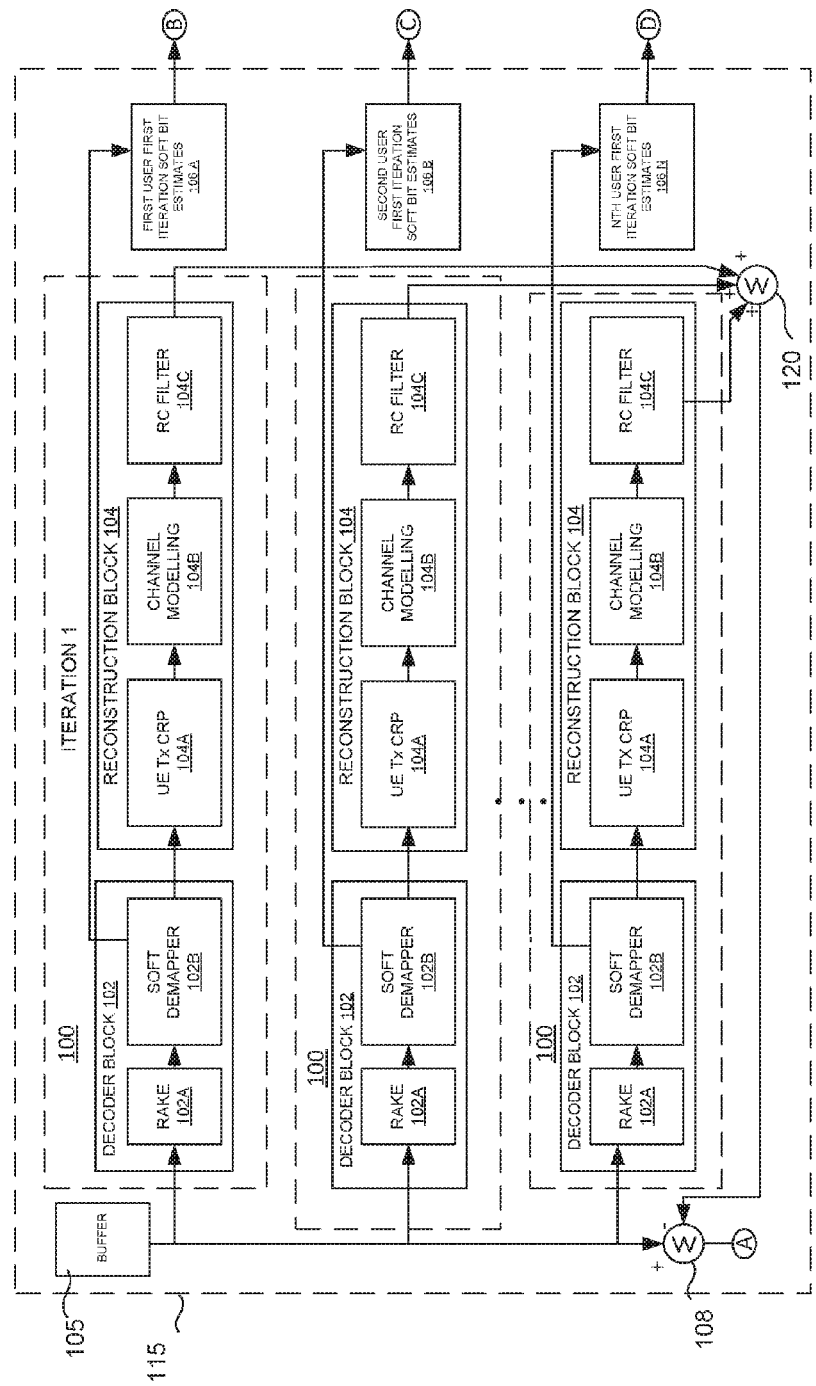
FIG. 2B-2D depicts a systematic process flow of a process of multiuser detection process based on parallel interference cancellation involving multiple users and multiple iterations at a receiver, according to an embodiment herein.
Figure 2C:
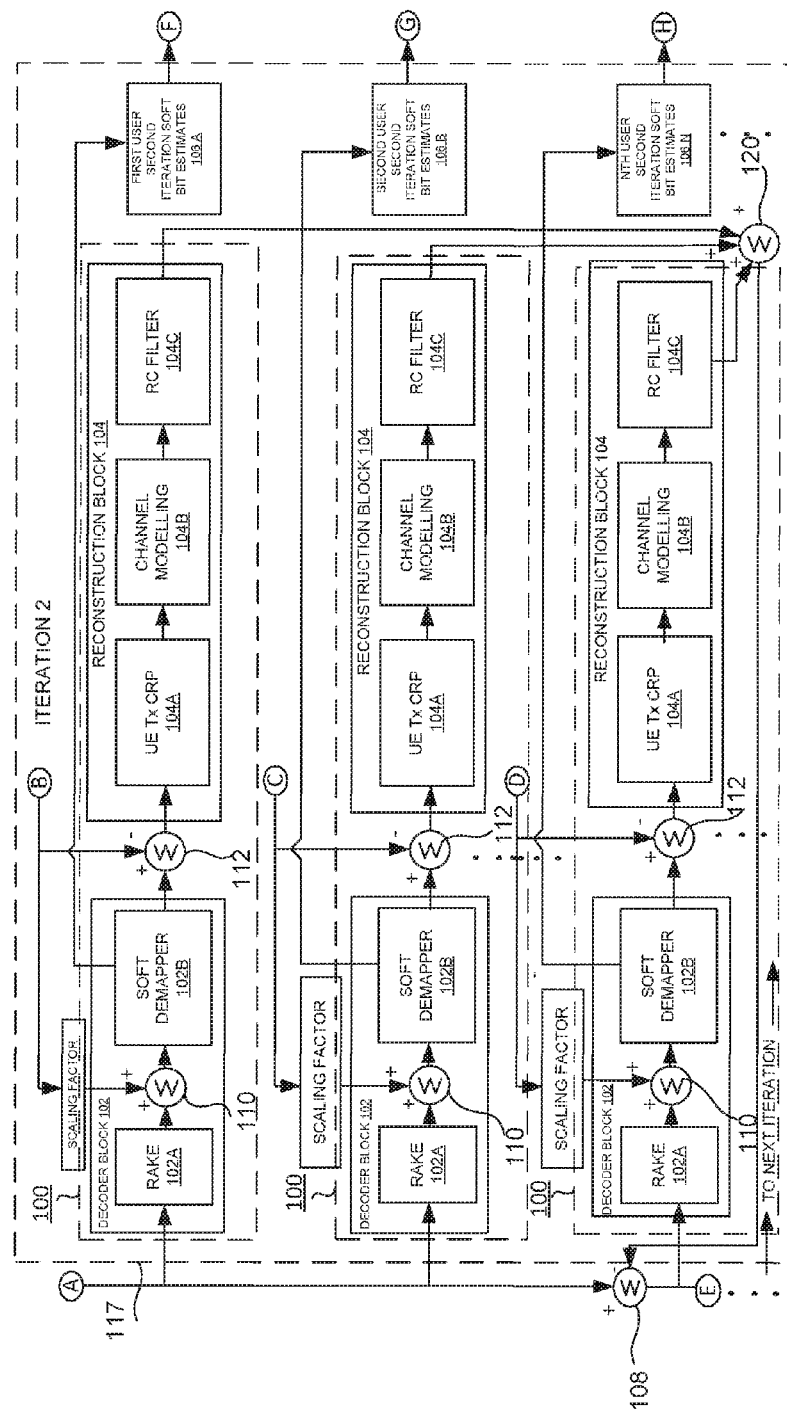
Figure 2D:
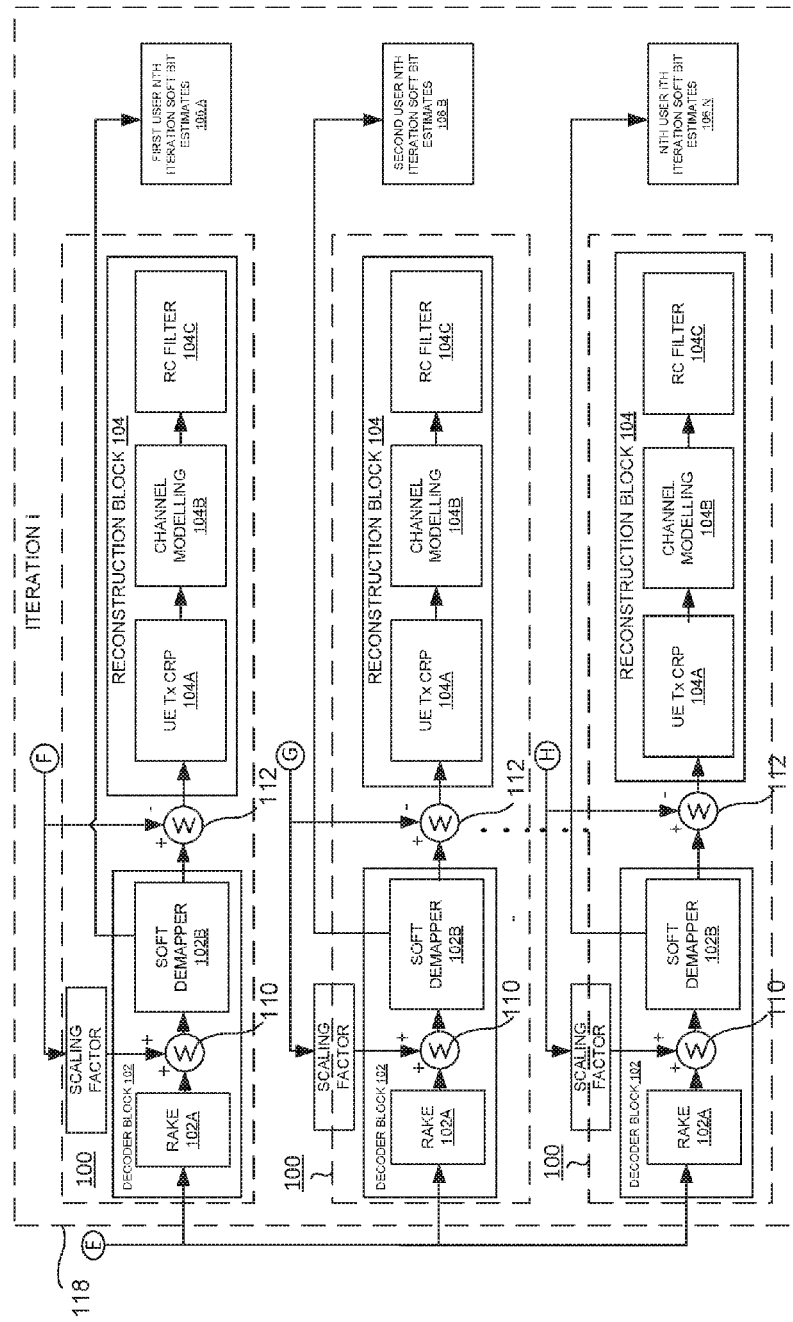

FIG. 2B-2D depicts a systematic process flow of a process of multiuser detection based on parallel interference cancellation involving multiple users and multiple iterations at a receiver 100, according to an embodiment herein. FIG. 2B depicts a first iteration 115 for N users, where N is a whole number greater than 1. The first iteration 115 of FIG. 2B for the first user is substantially similar to the first iteration 114 for the first user as described along with FIG. 2A and the first iteration 115 of FIG. 2B for every subsequent user is substantially similar to the first iteration 114 for the second user as described along with FIG. 2A. During the first iteration the soft bit estimates (such as 106a-106n) generated for N users is stored in the memory. During the first iteration for the $N^{th}$ user, the RAKE receives a composite signal. The decoder block 102 decodes the received composite signal to generate at least one of: a soft cancelled signal comprising $N^{th}$ user first iteration soft bit estimates for a $N^{th}$ user and the $N^{th}$ user first iteration soft bit estimates is stored in a memory unit. The reconstruction block 104 reconstructs the soft cancelled signal to generate an $N^{th}$ user first iteration reconstructed signal corresponding to the $N^{th}$ user, during the first iteration. The generated $N^{th}$ user first iteration reconstructed signal is added to a plurality of reconstructed signals generated through performing first iteration for (N−1) users to generate a combined reconstructed signal. The combined reconstructed signal is cancelled from the received composite signal to generate an interference cancelled signal.

FIG. 2C depicts a second iteration 117 for N users. The second iteration 117 of FIG. 1C for the first user is substantially similar to the second iteration 116 for the first user as described along with FIG. 1A and the second iteration 117 of FIG. 2C for every subsequent user is substantially similar to the second iteration 116 for the second user as described along with FIG. 2A. The soft bit estimates (such as 106A-106N) generated for N users during the second iteration 115 is also stored in the memory for subsequent use. FIG. 2D depicts an $i^{thh}$ iteration 118 for N users. The $i^{th}$ iteration 118 of FIG. 2D for the first user is substantially similar to the second iteration 116 for the first user as described along with FIG. 2A and the $i^{th}$ iteration 118 of FIG. 2D for every subsequent user is substantially similar to the second iteration 116 for the second user as described along with FIG. 2A. The soft bit estimates (such as 106A-106N) generated for N users during the i iterations is also stored in the memory for subsequent use.

In an embodiment, during an $i^{th}$ iteration for an $N^{th}$ user, where i is a positive integer greater than 1, the multiplier unit 110 multiples the stored $N^{th}$ user $(i-1)^{th}$ iteration soft bit estimates with a scaling factor and adds the multiplied $N^{th}$ user $(i-1)^{th}$ iteration soft bit estimates to $N^{th}$ user demodulated signal obtained from an $(i-1)^{th}$ interference cancelled signal obtained from an $(i-1)^{th}$ interference cancelled signal to obtain an intermediate signal. The soft demapper 102A performs a soft demapping of the intermediate signal at a soft demapper of the decoder block to generate an $N^{th}$ user $i^{th}$ iteration soft bit estimates, during the $i^{th}$ iteration. The memory unit stores the generated $N^{th}$ user $i^{th}$ iteration soft bit estimates. The cancellation unit 112 cancels the $N^{th}$ user $i^{th}$ iteration soft bit estimates from the $(i-1)^{th}$ iteration $N^{th}$ user soft bit estimates for generating a soft cancelled signal. The reconstruction block 104 reconstructs (a) the generated soft cancelled signal to generate $N^{th}$ user $i^{th}$ iteration reconstructed signal. The generated $N^{th}$ user $i^{th}$ iteration reconstructed signal is added through an adder unit 120, to a plurality of reconstructed signals generated through performing $i^{th}$ iteration for N-1 users to generate a combined reconstructed signal. The cancellation unit 108 cancels the combined reconstructed signal from an $(i-1)^{th}$ iteration interference cancelled signal to generate the $i^{th}$ iteration interference cancelled signal.

The processing of a signal at the receiver 100 is linear up to input of the soft demapper. If suppose, the receiver linear processing for an $i^{th}$ user is represented using the operator $\rightarrow i$. The process of interference cancellation reconstructs the other user signals ($u \neq i$) and subtracts the reconstructed signal from the composite signal ($x_{inp}$).

The process of interference cancellation further demodulates the signal for $i^{th}$ user, which is represented by $y_i \rightarrow i$, such that $y_i$ is given by the following equation (1):

$$y_i = x_{inp} - \sum_{\substack{u=1:N \\ u \neq i}} x_u \qquad (1)$$

A noise component y is given by the following equation (2):

$$y = x_{inp} - \sum_{u=1:N} x_u = y_i - x_i \qquad (2)$$

where $y \rightarrow i$ is a linear operation, and $x_i \rightarrow i$ is the output of a previous decoding operation (denoted by $d_i^{prev}$).

Where $y_i \rightarrow i$ is rewritten as $(y+x_i) \rightarrow i = (y \rightarrow i) + (x_i \rightarrow i) = (y \rightarrow i) + d_i^{prev}$.

Thus only single buffer needs to be processed repeatedly for one or more users.

In equation (1), the input to the receiver 100 (or RAKE 102a) for the one or more users is user specific, and requires storing the reconstructed signals of the one or more users. Whereas in equation (2), the input to the receiver 100 (or RAKE 102a) for the one or more users is identical. The noise component y is processed in the receiver 100, and the soft bit estimates from first iteration is added as an input to the soft-demapper. Since the receiver and soft demapper are linear, the operation is identical to subtracting interference at the receiver input.

Figure 3:
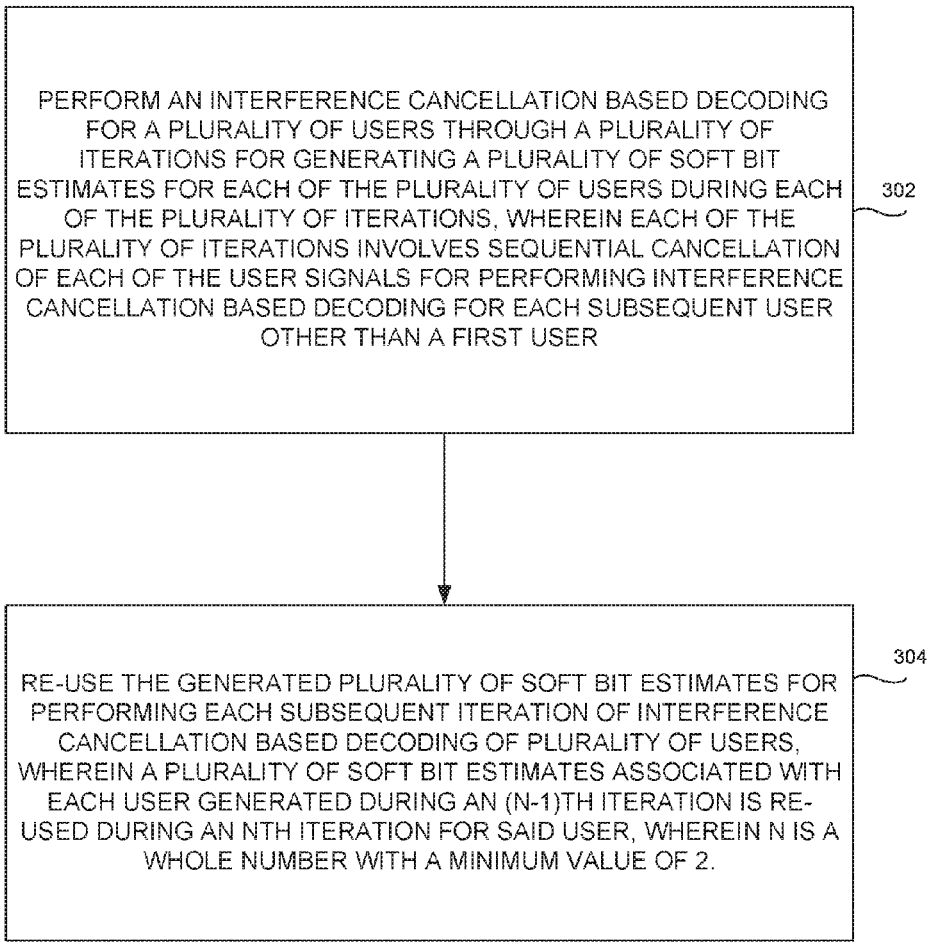
FIG. 3 is a flow diagram illustrating a method for multiuser detection at a receiver, according to an embodiment herein.

FIG. 3 is a flow diagram illustrating a method of multiuser detection at a receiver (such as receiver 100 of FIG. 1A) according to an embodiment herein. In an embodiment, at step 302, of the multiuser detection process, an interference cancellation based decoding is performed for a plurality of users through a plurality of iterations for generating a plurality of soft bit estimates for each of the plurality of users during each of the plurality of iterations. Each of the plurality of iterations involves sequential cancellation of each of the user signals for performing interference cancellation based decoding for each subsequent user other than a first user. In an embodiment, at step 304, the generated plurality of soft bit estimates are re-used for performing each subsequent iteration of the interference cancellation based decoding of the plurality of users. The plurality of soft bit estimates associated with each user generated during an $(i-1)^{th}$ iteration for the user is re-used during an nth iteration for the user, i being a whole number with a minimum value of 2.

The symbol level interference cancellation may be performed through a serial or a parallel process. The serial process is described with above along with FIGS. 1A-1D and is not repeated herein for the purpose of brevity. In an embodiment, during the serial process, the first iteration for an $N^{th}$ user includes performing an interference cancellation based decoding (through for example decoder 102 of FIG. 1) using an $(N-1)^{th}$ interference cancelled signal generated during the first iteration for an $(N-1)^{th}$ user, for generating an $N^{th}$ user $1^{st}$ iteration soft bit estimates and an $N^{th}$ interference cancelled signal by eliminating an $N^{th}$ user signal from the $(N-1)^{th}$ interference cancelled signal. The process involves decoding the $(N-1)^{th}$ interference cancelled signal by performing a soft demapping of the $(N-1)^{th}$ interference cancelled signal at a soft demapper of a decoder block of the receiver to generate the $N^{th}$ user $1^{st}$ iteration soft bit estimates associated with an $N^{th}$ soft cancelled signal. The generated $N^{th}$ user $1^{st}$ iteration soft bit estimates are stored in a memory unit associated with the receiver. Further the decoding also involves reconstructing the generated $N^{th}$ soft cancelled signal, at the reconstruction block of the receiver, to generate the $N^{th}$ reconstructed signal for the $N^{th}$ user, during the first iteration. The $N^{th}$ reconstructed signal is cancelled (by for example cancellation unit 110) for the subsequent user from the $(N-1)^{th}$ interference cancelled signal to generate an $N^{th}$ interference cancelled signal. The parallel process is described above along with FIGS. 2A-2D and is not repeated here for the purpose of brevity.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of symbol level interference cancellation at a receiver for multiuser detection, said method comprising:
    performing an interference cancellation based decoding for a plurality of users through a plurality of iterations for generating a plurality of soft bit estimates for each of said plurality of users during each of said plurality of iterations, wherein each of said plurality of iterations involves sequential cancellation of each of said user signals for performing interference cancellation based decoding for each subsequent user other than a first user; and
    re-using said generated plurality of soft bit estimates for performing each subsequent iteration of said interference cancellation based decoding of said plurality of users, wherein a plurality of soft bit estimates associated with each user generated during an $(N-1)^{th}$ iteration for said user is re-used during an $N^{th}$ iteration for said user, wherein N is a whole number with a minimum value of 2.

2. The method of claim 1, wherein a first iteration from among said plurality of iterations for a first user from among said plurality of users comprises:
a) receiving a composite signal at said receiver;
b) performing a decoding using said received composite signal for said first user, for generating a first user first iteration soft bit estimates and generating an first interference cancelled signal by eliminating a first user signal from said composite signal by:
performing a soft demapping of said received composite signal at a soft demapper of a decoder block of said receiver to generate said first user first iteration soft bit estimates corresponding to a first soft cancelled signal associated with said first user; and
storing said generated said first user first iteration soft bit estimates of said first soft cancelled signal in a memory unit associated with said receiver;
c) reconstructing said first soft cancelled signal, at a reconstruction block of said receiver, to generate a first user first iteration reconstructed signal for said first user, during said first iteration; and
d) cancelling said first user first iteration reconstructed signal from said composite signal to generate a first interference cancelled signal.

3. The method of claim 2, wherein a first iteration from among said plurality of iterations for a second user from among said plurality of users comprises:
performing a decoding using said first interference cancelled signal during said first iteration, for generating a second user first iteration soft bit estimates and generating a second interference cancelled signal by eliminating a second user signal from said first interference cancelled signal by:
decoding said first interference cancelled signal by performing a soft demapping of said generated first interference cancelled signal at a soft demapper of said decoder block to generate said second user first iteration soft bit estimates associated with said second soft cancelled signal; and
storing said generated second user first iteration soft bit estimates in a memory unit associated with said receiver; and
reconstructing said generated second soft cancelled signal, at said reconstruction block of said receiver, to generate said second user first iteration reconstructed signal for said second user, during said first iteration; and
cancelling said second reconstructed signal for said second user from said first interference cancelled signal to generate a second interference cancelled signal.

4. The method of claim 1, wherein a first iteration from among said plurality of iterations for an $N^{th}$ user from among said plurality of users comprises:
performing an interference cancellation based decoding using an $(N-1)^{th}$ interference cancelled signal generated during said first iteration for an $N-1^{th}$ user, for generating an $N^{th}$ user $N^{th}$ iteration soft bit estimates and an $N^{th}$ interference cancelled signal by eliminating an $N^{th}$ user signal from said $(N-1)^{th}$ interference cancelled signal by:
decoding said $(N-1)^{th}$ interference cancelled signal by performing a soft demapping of said $(N-1)^{th}$ interference cancelled signal at a soft demapper of a decoder block of said receiver to generate said $N^{th}$ user $1^{st}$ iteration soft bit estimates associated with an $N^{th}$ soft cancelled signal;
storing said generated $N^{th}$ user $1^{st}$ iteration soft bit estimates in a memory unit associated with said receiver; and
reconstructing said generated $N^{th}$ soft cancelled signal, at said reconstruction block of said receiver, to generate said $N^{th}$ reconstructed signal for said $N^{th}$ user, during said first iteration; and
cancelling said $N^{th}$ reconstructed signal for said second user from said $(N-1)^{th}$ interference cancelled signal to generate an $N^{th}$ interference cancelled signal.

5. The method of claim 3, wherein a second iteration from among said plurality of iterations for a first user from among said plurality of users comprises:
decoding an $N^{th}$ interference cancelled signal corresponding to an $N^{th}$ user at said decoder block by:
multiplying an $N^{th}$ user first iteration soft bit estimates with a scaling factor and adding said multiplied $N^{th}$ user first iteration soft bit estimates to a demodulated signal obtained from said second interference cancelled signal to obtain a first intermediate signal;
performing a soft demapping of said first intermediate signal at said soft demapper for generating a first user second iteration soft bit estimates for said first user; and
storing said generated first user second iteration soft bit estimates in a memory unit associated with said receiver;
cancelling said first user first iteration soft bit estimates from said first user second iteration soft bit estimates for generating a third soft cancelled signal; and
reconstructing said third soft cancelled signal at said reconstruction block of said receiver for generating said first user second iteration reconstructed signal for said first user during said second iteration; and
cancelling said first user second iteration reconstructed signal from said second interference cancelled signal to generate a third interference cancelled signal.

6. The method of claim 5, wherein a second iteration from among said plurality of iterations for said second user comprises:
decoding said third interference cancelled signal at said decoder block by:
multiplying said second user first iteration soft bit estimates with a scaling factor and adding said multiplied second user first iteration soft bit estimates to a demodulated signal obtained from said third interference cancelled signal to obtain a second intermediate signal;
performing a soft demapping of said second intermediate signal at said soft demapper for generating second user second iteration soft bit estimates for said second user; and
storing said generated second user second iteration soft bit estimates in a memory unit associated with said receiver;
cancelling said second user first iteration soft bit estimates from said first iteration from said second user second iteration soft bit estimates for generating a fourth soft cancelled signal; and
reconstructing said fourth soft cancelled signal at said reconstruction block of said receiver for generating said fourth reconstructed signal for said second user during said second iteration.

7. The method of claim 5, wherein $i^{th}$ iteration from among said plurality of iterations for said $N^{th}$ user from among said plurality of users comprises:
  multiplying said $N^{th}$ user $(i-1)^{th}$ iteration soft bit estimates with a scaling factor and adding said multiplied $N^{th}$ user $(i-1)^{th}$ iteration soft bit estimates to a demodulated signal obtained from an interference cancelled signal generated from one of ith iteration for $(N-1)^{th}$ user or generated from $(i-1)^{th}$ iteration for $N_{total}$ user to obtain an intermediate signal, wherein $N_{total}$ is a total number of users;
  performing a soft demapping of said intermediate signal at said soft demapper for generating $N^{th}$ user $i^{th}$ iteration soft bit estimates for said $N^{th}$ user; and
  storing said generated $N^{th}$ user $i^{th}$ iteration soft bit estimates in a memory unit associated with said receiver;
  cancelling said $N^{th}$ user first iteration soft bit estimates from said $N^{th}$ user $(i-1)^{th}$ iteration soft bit estimates for generating a $N^{th}$ soft cancelled signal;
  reconstructing said $N^{th}$ soft cancelled signal at said reconstruction block of said receiver for generating said $N^{th}$ user $i^{th}$ iteration reconstructed signal; and
  cancelling said $i^{th}$ iteration reconstructed signal from the $(i-1)^{th}$ iteration interference cancelled signal to generate the $k^{th}$ interference cancelled signal, wherein k is (iteration$-1$)*$N_{total}$+N, wherein iteration is a current iteration.

8. The method of claim 1, wherein a first iteration from among said plurality of iterations for a first user and a second user from among said plurality of users comprises:
  a) receiving a composite signal at a decoder block of said receiver;
  b) decoding said received composite signal at said decoder block to generate at least one of: a first user first iteration soft bit estimates for a first user and a second user first iteration soft bit estimates for a second user, during said first iteration, wherein said first user first iteration soft bit estimates and said second user first iteration soft bit estimates are stored in a memory unit;
  c) reconstructing, at a reconstruction block of said receiver, said first user first iteration soft bit estimates to generate a first user first iteration reconstructed signal corresponding to said first user and said second user first iteration soft bit estimates to generate a second user first iteration reconstructed signal corresponding to said second user, during said first iteration;
  d) adding said generated first user first iteration reconstructed signal and said generated second user second iteration reconstructed signal to generate a first combined reconstructed signal; and
  e) cancelling said first combined reconstructed signal from said received composite signal to generate a first interference cancelled signal.

9. The method of claim 8, wherein said decoding comprises:
  performing a soft demapping of said received composite signal at a soft demapper of said decoder block to generate said first user first iteration soft bit estimates corresponding to said first soft cancelled signal associated with said first user and said second user first iteration soft bit estimates corresponding to said second soft cancelled signal of said second user; and
  storing said generated first user first iteration soft bit estimates and said generated second user first iteration soft bit estimates in said memory unit associated with said receiver.

10. The method of claim 8, wherein a second iteration for said first user and said second user comprises:
  decoding said first interference cancelled signal at said decoder block by:
    multiplying said stored first user first iteration soft bit estimates with a scaling factor and adding said multiplied first user first iteration soft bit estimates to the said first user demodulated signal obtained from the said first interference cancelled signal for the said first user to obtain a first intermediate signal and multiplying said stored second user first iteration soft bit estimates with said scaling factor and adding said multiplied second user first iteration soft bit estimates to the said second user demodulated signal obtained from the said first interference cancelled signal to obtain a second intermediate signal;
    performing a soft demapping of said first intermediate signal at a soft demapper of said decoder block to generate a first user second iteration soft bit estimates, during said second iteration;
    performing a soft demapping of said second intermediate signal at said soft demapper of said decoder block to generate a second user second iteration soft bit estimates, during said second iteration; and
    storing said generated first user second iteration soft bit estimates and said generated second user second iteration soft bit estimates in said memory unit associated with said receiver;
  cancelling said first user first iteration soft bit estimates of said first iteration from said first user second iteration soft bit estimates for generating a third soft cancelled signal and cancelling said second user first iteration soft bit estimates of said first iteration from said second user second iteration soft bit estimates for generating a fourth soft cancelled signal; and
  reconstructing (a) said generated third soft cancelled signal, (b) generated fourth soft cancelled signal, at said reconstruction block of said receiver, to generate (i) said first user second iteration reconstructed signal for said first user and (ii) said second user second iteration reconstructed signal for said second user, respectively.

11. The method of claim 8, wherein a first iteration for said $N^{th}$ user comprises:
  receiving a composite signal at a decoder block of said receiver;
  decoding said received composite signal at said decoder block to generate at least one of: a soft cancelled signal comprising $N^{th}$ user first iteration soft bit estimates for a $N^{th}$ user, wherein said $N^{th}$ user first iteration soft bit estimates is stored in a memory unit;
  reconstructing, at a reconstruction block of said receiver, said soft cancelled signal to generate a $N^{th}$ user first iteration reconstructed signal corresponding to said $N^{th}$ user, during said first iteration;
  adding said generated $N^{th}$ user first iteration reconstructed signal and a plurality of reconstructed signals generated through performing first iteration for N$-1$ users to generate a combined reconstructed signal; and
  cancelling said combined reconstructed signal from said received composite signal to generate an interference cancelled signal.

12. The method of claim 8, wherein an $i^{th}$ iteration for said Nth user comprises:
  multiplying said stored $N^{th}$ user $(i-1)^{th}$ iteration soft bit estimates with a scaling factor and adding said multiplied $N^{th}$ user $(i-1)^{th}$ iteration soft bit estimates to said $N^{th}$ user demodulated signal obtained from an $(i-1)^{th}$ interference cancelled signal to obtain an intermediate signal;

performing a soft demapping of said intermediate signal at a soft demapper of said decoder block to generate an $N^{th}$ user $i^{th}$ iteration soft bit estimates, during said $i^{th}$ iteration;

storing said generated $N^{th}$ user $i^{th}$ iteration soft bit estimates in a memory unit associated with said receiver;

cancelling said $N^{th}$ user $i^{th}$ iteration soft bit estimates from said $(i-1)^{th}$ iteration $N^{th}$ user soft bit estimates for generating a soft cancelled signal;

reconstructing (a) said generated soft cancelled signal at said reconstruction block of said receiver to generate said $N^{th}$ user $i^{th}$ iteration reconstructed signal; and adding said generated $N^{th}$ user $i^{th}$ iteration reconstructed signal and a plurality of reconstructed signals generated through performing $i^{th}$ iteration for (N−1) users to generate a combined reconstructed signal; and cancelling the combined reconstructed signal from an $(i-1)^{th}$ iteration interference cancelled signal to generate the $i^{th}$ iteration interference cancelled signal.

13. A receiver circuit for multiuser detection based on symbol level interference cancellation, said receiver circuit configured to:

perform an interference cancellation based decoding for a plurality of users through a plurality of iterations for generating a plurality of soft bit estimates for each of said plurality of users during each of said plurality of iterations, wherein each of said plurality of iterations involves sequential cancellation of each of said user signals for performing interference cancellation based decoding for each subsequent user other than a first user; and re-use said generated plurality of soft bit estimates for performing each subsequent iteration of said interference cancellation based decoding of said plurality of users, wherein a plurality of soft bit estimates associated with each user generated during an $(N-1)^{th}$ iteration for said user is re-used for during an $N^{th}$ iteration for said user, wherein N is a whole number with a minimum value of 2.

14. The receiver circuit of claim 13, comprising:
a decoder block comprising:
    a RAKE receiver circuit configured to receive a composite signal at said receiver and perform a signal demodulation of said composite signal; and
    a soft demapper communicatively associated with said RAKE receiver and configured to decoding of said demodulated signal for said first user, for generating a first user first iteration soft bit estimates and generating an first interference cancelled signal by eliminating a first user signal from said composite signal, during a first iteration from among said plurality of iterations for a first user from among said plurality of users, wherein said soft demapper is configured to perform a soft demapping by:
        generating said first user first iteration soft bit estimates corresponding to a first soft cancelled signal associated with said first user; and storing said generated said first user first iteration soft bit estimates of said first soft cancelled signal in a memory unit associated with said receiver;
    a reconstruction block communicatively associated with said decoder block and configured to reconstruct said first soft cancelled signal to generate a first user first iteration reconstructed signal for said first user, during said first iteration for a first user; and
    a cancellation unit coupled to said reconstruction block configured to cancel said first user first iteration reconstructed signal from said composite signal to generate a first interference cancelled signal.

15. The receiver circuit of claim 14, wherein said decoder block is further configured to:
perform a decoding using said first interference cancelled signal during a first iteration for a second user, for generating a second user first iteration soft bit estimates and generating a second interference cancelled signal by eliminating a second user signal from said first interference cancelled signal, wherein said soft demapper is configured to:
    decode said first interference cancelled signal by performing a soft demapping of said generated first interference cancelled signal to generate said second user first iteration soft bit estimates associated with said second soft cancelled signal, during said first iteration for said second user; and
    store said generated second user first iteration soft bit estimates in a memory unit associated with said receiver.

16. The receiver circuit of claim 14, wherein said reconstruction block is configured to reconstruct said generated second soft cancelled signal to generate said second user first iteration reconstructed signal for said second user, during said first iteration and said cancellation unit is configured to cancel said second reconstructed signal for said second user from said first interference cancelled signal to generate a second interference cancelled signal.

17. The receiver circuit of claim 14, wherein said decoder block is configured to:
perform, during a first iteration from among said plurality of iterations for an $N^{th}$ user from among said plurality of users, a decoding using an $(N-1)^{th}$ interference cancelled signal generated, for generating an $N^{th}$ user 1st iteration soft bit estimates and an $N^{th}$ interference cancelled signal by eliminating an $N^{th}$ user signal from said $(N-1)^{th}$ interference cancelled signal, wherein said soft demapper is configured to:
    decode said $(N-1)^{th}$ interference cancelled signal by performing a soft demapping of said $(N-1)^{th}$ interference cancelled signal to generate said $N^{th}$ user first iteration soft bit estimates associated with an $N^{th}$ soft cancelled signal; and
    store said generated $N^{th}$ user first iteration soft bit estimates in a memory unit associated with said receiver;
wherein said reconstruction block is configured to reconstruct said generated $N^{th}$ soft cancelled signal to generate said $N^{th}$ reconstructed signal for said $N^{th}$ user, during said first iteration; and
wherein said cancellation unit is configured to cancel said $N^{th}$ reconstructed signal for said $N^{th}$ user from said $(N-1)^{th}$ interference cancelled signal to generate an $N^{th}$ interference cancelled signal.

18. The receiver circuit of claim 14, wherein said decoder block is configured to perform during an $i^{th}$ iteration from among said plurality of iterations for said $N^{th}$ user from among said plurality of users:
multiply said $N^{th}$ user $(i-1)^{th}$ iteration soft bit estimates with a scaling factor and adding said multiplied $N^{th}$ user $(i-1)^{th}$ iteration soft bit estimates to a demodulated signal obtained from interference cancelled signal generated from one of $i^{th}$ iteration for $(N-1)^{th}$ user or generated from (i−1)$^{th}$ iteration for N$_{total}$ user to obtain an intermediate signal, wherein N$_{total}$ is a total number of users;

wherein said soft demapper is configured to perform a soft demapping of said intermediate signal for generating N$^{th}$ user i$^{th}$ iteration soft bit estimates for said N$^{th}$ user and store said generated N$^{th}$ user i$^{th}$ iteration soft bit estimates in a memory unit associated with said receiver, wherein said cancellation unit is configured to cancel said N$^{th}$ user i$^{th}$ iteration soft bit estimates from said N$^{th}$ user (i−1)$^{th}$ iteration soft bit estimates for generating a N$^{th}$ soft cancelled signal, wherein said reconstruction block is configured to reconstruct said N$^{th}$ soft cancelled signal for generating said N$^{th}$ user i$^{th}$ iteration reconstructed signal, and wherein said cancellation unit is further configured to subtract said i$^{th}$ iteration reconstructed signal from the (i−1)$^{th}$ iteration interference cancelled signal to generate the k$^{th}$ interference cancelled signal, wherein k is (iteration−1)*N$_{total}$+N, wherein iteration is a current iteration.

19. The receiver circuit of claim 13, comprising:
a decoder block comprising:
  a RAKE receiver circuit configured to receive a composite signal during a first iteration for a first user and a second user from among said plurality of users and demodulated said composite signal;
  a soft demapper communicatively associated with said RAKE receiver circuit and configured to perform, during said first iteration for said first user and said second user, decoding of said demodulated composite signal at said decoder block to generate at least one of: a first soft cancelled signal comprising a first user first iteration soft bit estimates for a first user and a second soft cancelled signal comprising a second user first iteration soft bit estimates for a second user, wherein said first user first iteration soft bit estimates and said second user first iteration soft bit estimates are stored in a memory unit;
a reconstruction block communicatively associated with said decoder block and configured to reconstruct said first soft cancelled signal to generate a first user first iteration reconstructed signal corresponding to said first user and said second soft cancelled signal to generate a second user first iteration reconstructed signal corresponding to said second user, during said first iteration;
an adder unit coupled to said reconstruction block and configured to add said generated first user first iteration reconstructed signal and said generated second user second iteration reconstructed signal to generate a first combined reconstructed signal; and
a cancellation unit coupled to said reconstruction block and configured to cancel said first combined reconstructed signal from said received composite signal to generate a first interference cancelled signal.

20. The receiver circuit of claim 19, wherein said decoder block comprises a soft demapper configured to:
perform a soft demapping of said received composite signal to generate said first user first iteration soft bit estimates corresponding to said first soft cancelled signal associated with said first user and said second user first iteration soft bit estimates corresponding to said second soft cancelled signal of said second user, during said first iteration for said first user and said second user; and
store said generated first user first iteration soft bit estimates and said second user first iteration soft bit estimates in said memory unit associated with said receiver.

21. The receiver circuit of claim 19, wherein said soft demapper is configured to perform, during a second iteration for said first user:
decoding said first interference cancelled signal by:
  multiplying said stored first user first iteration soft bit estimates with a scaling factor and adding said multiplied first user first iteration soft bit estimates to the said first user demodulated signal obtained from the said first interference cancelled signal for the said first user to obtain a first intermediate signal and multiplying said stored second user first iteration soft bit estimates with said scaling factor and adding said multiplied second user first iteration soft bit estimates to the said second user demodulated signal obtained from the said first interference cancelled signal to obtain a second intermediate signal;
performing a soft demapping of said first intermediate signal at a soft demapper of said decoder block to generate a first user second iteration soft bit estimates, during said second iteration;
performing a soft demapping of said second intermediate signal at said soft demapper of said decoder block to generate a second user second iteration soft bit estimates, during said second iteration; and
storing said generated first user second iteration soft bit estimates and said generated second user second iteration soft bit estimates in said memory unit associated with said receiver;
wherein said cancellation unit is configured to cancel said first user first iteration soft bit estimates of said first iteration from said first user second iteration soft bit estimates for generating a third soft cancelled signal and cancelling said second user first iteration soft bit estimates of said first iteration from said second user second iteration soft bit estimates for generating a fourth soft cancelled signal; and
wherein said reconstruction block is configured to reconstruct (a) said generated third soft cancelled signal, (b) generated fourth soft cancelled signal, at said reconstruction block of said receiver, to generate (i) said first user second iteration reconstructed signal for said first user and (ii) said second user second iteration reconstructed signal for said second user.

22. The receiver circuit of claim 19, wherein said decoder block is further configured to perform during i$^{th}$ iteration for said N$^{th}$ user:
multiplying said stored N$^{th}$ user (i−1)$^{th}$ iteration soft bit estimates with a scaling factor and adding said multiplied N$^{th}$ user (i−1)$^{th}$ iteration soft bit estimates to said N$^{th}$ user demodulated signal obtained from an (i−1)$^{th}$ interference cancelled signal to obtain an intermediate signal, wherein said soft demapper block is configured to:
  perform a soft demapping of said intermediate signal to generate an N$^{th}$ user i$^{th}$ iteration soft bit estimates, during said i$^{th}$ iteration; and
  store said generated N$^{th}$ user i$^{th}$ iteration soft bit estimates in a memory unit associated with said receiver,
wherein said cancellation unit is configured to cancel said N$^{th}$ user i$^{th}$ iteration soft bit estimates from said (i−1)$^{th}$ iteration N$^{th}$ user soft bit estimates for generating a cancelled signal, wherein said reconstruction block is configured to reconstruct (a) said generated cancelled signal at said reconstruction block of said receiver to generate said $N^{th}$ user $i^{th}$ iteration reconstructed signal, and wherein said cancellation unit is further configured to subtract said $i^{th}$ iteration reconstructed signal from the $(i-1)^{th}$ iteration interference cancelled signal to generate the $k^{th}$ interference cancelled signal, wherein k is $(iteration-1)*N_{total}+N$, wherein iteration is a current iteration.

* * * * *